United States Patent
Takahashi et al.

[15] 3,673,125

[45] June 27, 1972

[54] METHOD OF PRODUCING POLYVINYL ACETAL POROUS ARTICLES

[72] Inventors: Kenji Takahashi; Toshio Yamamura; Mitsuzo Ono; Korekiyo Eda, all of Sowamachi, Japan

[73] Assignee: Kanegafuchi Boseki Kabushiki Kaisha, Tokyo, Japan

[22] Filed: May 6, 1970

[21] Appl. No.: 35,104

[30] Foreign Application Priority Data

May 10, 1969 Japan....................................44/35516

[52] U.S. Cl. .....................260/2.5 F, 260/174 ST, 260/73 L, 156/77, 156/78, 252/316, 161/159
[51] Int. Cl............................................C08j 1/14, C08j 1/30
[58] Field of Search...............................................260/2.5 F

[56] References Cited

UNITED STATES PATENTS

| | | | |
|---|---|---|---|
| 2,609,347 | 9/1952 | Wilson | 260/2.5 F |
| 3,547,837 | 12/1970 | Ashikaga | 260/2.5 F |

*Primary Examiner*—Samuel H. Blech
*Assistant Examiner*—Morton Foelak
*Attorney*—Woodhams, Blanchard and Flynn

[57] ABSTRACT

A mixed solution of polyvinyl alcohol and gelatinized starch for manufacturing polyvinyl acetal porous articles is prepared by introducing forcedly at a constant rate a dispersion formed by adding starch particles or a suspension of starch particles to an aqueous solution of polyvinyl alcohol having a relatively low temperature to one end of a cylindrical heater provided with an inner stirrer and a heating means in the outer periphery, heating the cylindrical heater at a sufficient temperature to gelatinize the starch in the dispersion by the time the continuously flowing dispersion reaches the other end of the cylindrical heater and withdrawing the gelatinized dispersion continuously from the cylindrical heater.

5 Claims, 7 Drawing Figures

METHOD OF PRODUCING POLYVINYL ACETAL POROUS ARTICLES

The present invention relates to an improvement in the production of polyvinyl acetal porous articles.

Polyvinyl acetal porous articles have been already produced commercially for use as industrial and engineering materials and domestic materials. The methods for producing the polyvinyl acetal porous articles have been disclosed in Japanese Pat. Nos. 196,838 and 215,405 and as the pore forming agents, pastes of gelatinized starch and derivatives thereof are used. The conventional general methods involve adding paste of gelatinized starch to an aqueous solution of polyvinyl alcohol and acetalizing the polyvinyl alcohol in the presence of an acid and an aldehyde to form a porous article. Alternatively, a heated aqueous solution of polyvinyl alcohol is mixed with a slurry of starch and then the starch is heated and gelatinized in the aqueous solution of polyvinyl alcohol to form a mixed solution for producing a porous article, to which an acid and an aldehyde are added to form the porous article.

However, these methods are batch operations and consequently it is difficult to obtain always uniform products and the most major cause therefor lies in the "gelatinization" of starch.

When a dispersion of starch in water is gradually heated to gelatinize the starch, the course of gelatinization is very complicated. If the course of gelatinization when the temperature is raised at a constant rate is shown by a graph of time-viscosity relation, inherent viscosity curves for each of various starches can be obtained. Since starch particles are not swelled at a low temperature, the viscosity of the aqueous dispersion is the same as that of water but at a particular temperature the starch particles are rapidly swelled and the viscosity of the liquid rises quickly and this temperature is referred to as the "gelatinization starting temperature" and each starch has an inherent gelatinizing temperature. After the quickly raised viscosity reaches the maximum value, the viscosity lowers gradually and the so called "aging phenomenon" appears. The gelatinization starting temperatures of potato starch and corn starch are about 60° C. and 70° C. respectively. When reaching the maximum viscosity, even if the increase of temperature is stopped and the temperature is maintained at a constant value, the viscosity of the paste starch does not retain the constant value but generally decreases.

This variation of viscosity shows the swelling of starch particles, gelatinization and aging, as a macro phenomenon and more strictly speaking, even if the starch paste maintains a constant apparent viscosity, it should be considered that the physical properties of the starch particles themselves are varying every moment. The diameter and texture of the pores, which are the most important properties of the polyvinyl acetal porous articles, are most highly influenced by the gelatinized state of the paste starch when using starch as the pore forming agent, and therefore it is important in the quality control to obtain always starches having the same gelatinized state for each lot. Since the gelatinization phenomenon of starch is a continuous irreversible variation which is liable to be influenced by the heat hysteresis, it is very difficult to obtain always the same gelatinized state of starch. Accordingly, in the batch system, the unevenness of quality between the lots is naturally large, even if the temperature and viscosity are controlled strictly.

According to the conventional batch system of production, a mixture of an aqueous polyvinyl alcohol solution and gelatinized starch, which has been previously prepared by heating, is once cooled to room temperature and an acid and an aldehyde are added thereto to prepare a reaction solution for producing spongy articles, which solution is charged in the desired molds and then heated under defined conditions to effect the acetalization reaction, whereby porous materials are formed. In this case, even at a not so high temperature the gelatinized starch in the mixed solution varies every moment. In addition, the acetalization reaction of polyvinyl alcohol proceeds in the above reaction solution with the passage of time prior to charging the solution into molds and the state of the reaction solution varies, and consequently the originally molded products are not always the same as the finally molded products in the physical properties of the formed spongy articles and as the molding time is longer, the difference becomes larger. If an aldehyde and an acid have been already added to the polyvinyl alcohol-starch mixed solution, as mentioned above the acetalization reaction proceeds before the acetalization is caused in the mold. Even if an acid and an aldehyde are added immediately before charging into molds, the physical properties of the polyvinyl alcohol-gelatinized starch mixed solution vary with the passage of time and this causes problems.

The inventors have made a large number of investigations for attaining a method for producing excellent polyvinyl acetal porous articles and discovered a continuous method for producing a reaction solution for porous articles, which is most effective for obtaining uniform polyvinyl acetal porous articles.

The present invention is characterized in that powdery starch or a dispersion of starch in water is added to an aqueous solution of polyvinyl alcohol cooled to such a temperature that the starch is not gelatinized, the resulting mixture is forcedly introduced continuously into a cylindrical heater, provided with an inner stirrer, from one end at a constant rate and is heated to a sufficient temperature to gelatinize the starch in the dispersion during its passage through the heater and a homogeneously mixed solution of the polyvinyl alcohol and the gelatinized starch is taken out continuously from the other end of the heater.

According to the present invention, the mixture of an aqueous solution of polyvinyl alcohol and a starch slurry is heated during its passage through the cylindrical heater provided with a continuous extruding device, whereby the starch is gelatinized and therefore it is possible to always regenerate the very stable gelatinization condition by controlling the heating temperature, the rate of movement through the cylindrical heater and the temperature of the outside heating device. Accordingly, the uniformly gelatinized starch, which is the first requirement for obtaining the uniform spongy articles, can be always obtained. More particularly, according to the present invention a homogeneously mixed solution of the gelatinized starch and the aqueous solution of polyvinyl alcohol, which has been heated under a constant condition, is extruded successively without staying in the heater; accordingly, the mixed solution taken out from the outlet of the cylindrical heater has always the same heat hysteresis and this process is the most ideal one for obtaining the reaction solution for obtaining uniform polyvinyl acetal porous articles. Since the thus taken out mixed solution has too high a temperature to effect the subsequent steps smoothly, the mixed solution is cooled to an acceptable temperature and then there are added an acid and an aldehyde in defined amounts continuously. The resulting reaction solution is charged into the desired molds in turn and is subjected to acetalization under a defined condition to form uniform spongy articles.

According to the present invention, the quality can be uniform as mentioned above and further the process can be took place automatically and in mass production. According to the conventional bath process, it is difficult to obtain uniform spongy products and mass production cannot be effected. However, the present invention makes it possible to attain the mass production of the spongy products. Moreover, the quality is uniform. Accordingly, the present invention has a very important significance in the production of the spongy products.

As mentioned above, the gelatinization phenomenon of starch is the most important function in the course of production of the polyvinyl acetal porous articles and the gelatinization behavior of starch is very complicated and will be shown by the gelatinization curves of some embodiments hereinafter.

For a better understanding of the invention, reference is taken to the accompanying drawings, wherein:

FIGS. 1, 2 and 3 show various types of the viscosity variations observed when 6.25 percent solution of potato starch in water is heated and gelatinized.

Figure 1:
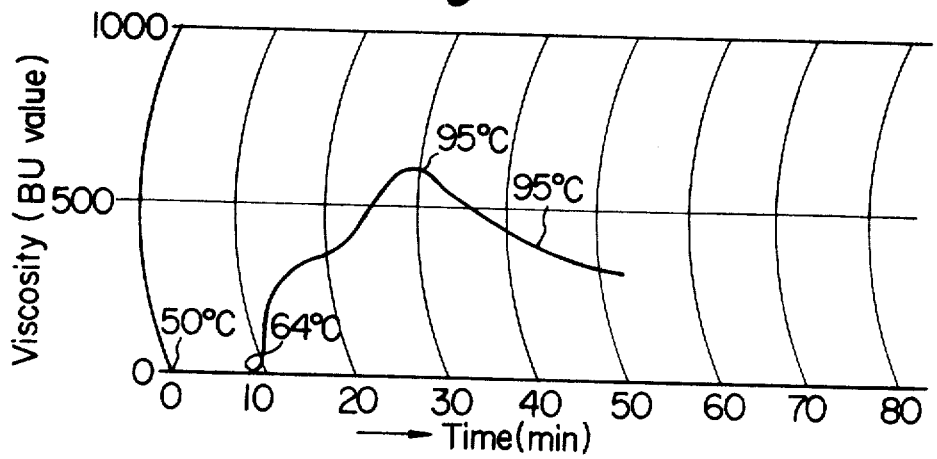
FIGS. 1, 2 and 3 show gelatinization curves of starch.

FIG. 1 shows a graph obtained when the temperature was raised from 50° to 95° C. (1.5° C./min.) and then said temperature was maintained. The viscosity in the ordinate shows Bu value measured by means of Brabender Amylograph. In this case, the starch starts to swell at 64° C. and the viscosity increases rapidly and the swelling of the particles becomes a maximum at 95° C. and thereafter the swollen particles begin to collapse at the constant temperature of 95° C. and the viscosity gradually decreases.

Figure 2:
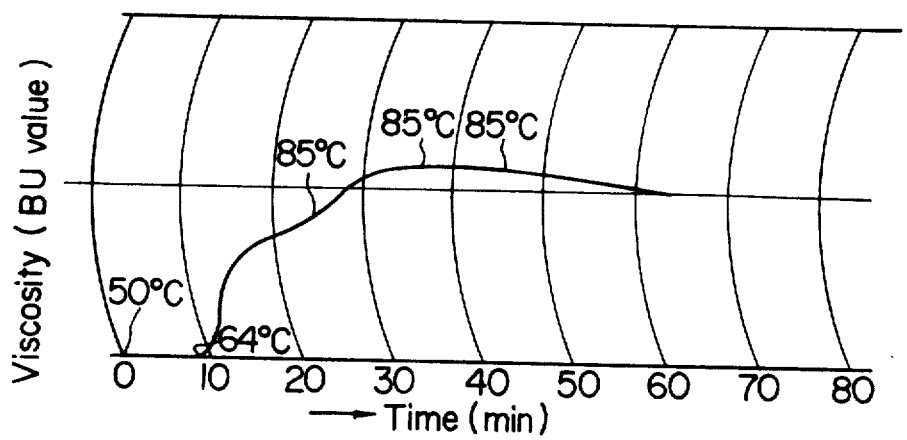

FIG. 2 shows a graph obtained when the temperature was raised from 50° to 85° C. (1.5° C./min.) and then said temperature was maintained. The viscosity increases even after maintaining the temperature at 85° C. and still the gelatinization and swelling of the starch proceed. Also in this case, the viscosity decreases gradually after the maximum viscosity has been reached.

Figure 3:
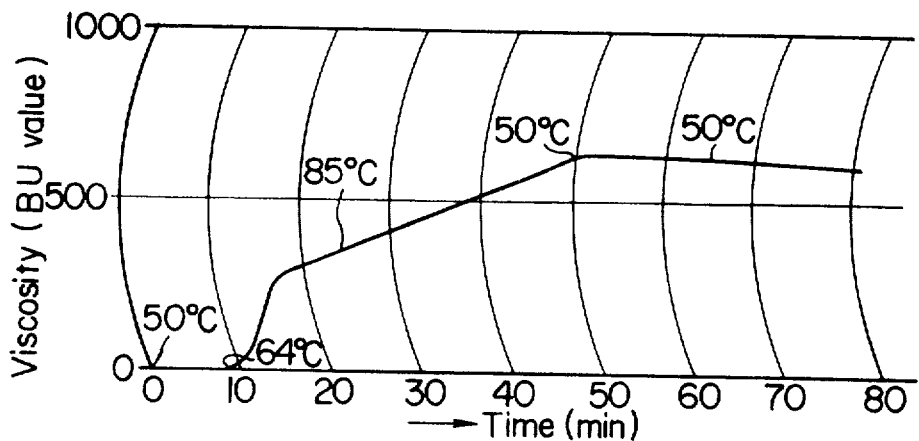

FIG. 3 shows a graph obtained when the temperature was once raised from 50° to 85° C. as in FIG. 2 and then immediately cooled to 50° C. (1.5° C./min.), after which 50° C. was maintained.

The viscosity variation when the temperature is cooled from 85° to 50° C. (1.5° C./min.) in FIG. 3 does not show the variation as in the case when the temperature was maintained at 85° C. in FIG. 2 and the viscosity increases in a straight line. However, this viscosity increase is due to the decrease of temperature and is not a variation resulting from the aging of gelatinization. The viscosity retains the constant value after the temperature has been lowered to 50° C. At such a low temperature below the gelatinizing temperature, the aging rate of the starch itself is very slow and therefore the apparent viscosity will not change.

The behavior of starch is complicated as mentioned above and continues the irreversible variation constantly during the application of heat.

In the conventional batch process, starch located at one point on the curve varying rapidly or slowly as shown in FIGS. 1 and 2 is used, so that it is difficult to obtain any desired constantly gelatinized starch and this is the most important cause of non-uniformity in the quality of the spongy products.

Further explanation will be made with reference to one embodiment. In FIG. 2 the starch slurry starts the gelatinization at 64° C. and the viscosity increases rapidly. The gradient at about 70° C. is gentle and then when the increase of temperature is stopped at 85° C. and the temperature is maintained, the viscosity increases slightly and reaches a peak and then decreases again gradually. By using each starch at 10, 20 and 30 minutes after the gelatinization has started, polyvinyl acetal porous articles were prepared and the properties of the porous articles were determined and the results as shown in the following were obtained.

TABLE 1

| Sample | Time from the beginning of gelatinization (min.) | Viscosity of gelatinized starch Bu value | Properties of spongy articles | |
|---|---|---|---|---|
| | | | Average diameter of pores ($\mu$) | Porosity (%) |
| 1 | 10 | 155 | 380 | 91 |
| 2 | 20 | 520 | 130 | 88 |
| 3 | 30 | 530 | 111 | 86 |

As seen from the above table, if the heat hysteresis of the gelatinized starch varies, the physical properties of the resulting polyvinyl acetal spongy articles vary even when the time difference is only 10 minutes.

It is noticeable that even though the viscosity of starch does not substantially vary apparently in the samples 2 and 3, the physical properties of the spongy articles vary definitely. From these facts it will be understood that the spongy articles obtained by the conventional batch process are non-uniform in quality.

The method for producing the mixed solution according to the present invention is different from the conventional batch process and the state of the gelatinized starch is always constant, and accordingly, if the gelatinized starch-polyvinyl alcohol mixed solution is cooled by an independent means, for example, at a low temperature as about 50° C. as in FIG. 3, the swelling and gelatinization do not proceed, so that a stable viscosity can be maintained for a certain period. Then, if an acid catalyst and an aldehyde are added quantitatively to the mixed solution having a stable viscosity and the resulting reaction solution is charged into the desired mold, polyvinyl acetal porous articles having a very uniform quality can be obtained.

It is not always an essential requirement of the present invention to cool the gelatinized mixed solution immediately after the gelatinization but considering the time until the molding takes place and the rapid acetalization reaction at a high temperature after mixing in an acid and an aldehyde, it is desirable to cool the gelatinized mixed solution immediately and then to add the acid and the aldehyde thereto continuously and quantitatively. For the cooling, a separate heat exchanger may be used or if defoaming of the mixed solution is desired, a vacuum defoaming cooler may be used.

The difference of the present invention system from the conventional batch system is shown in the following table with respect to the physical properties of the resulting polyvinyl acetal porous articles. $\bar{x}$ is an average value in 8 lots of productions of 1,000 l of the mixed solution in one time feeding amount and R is a range between the maximum value and the minimum value.

0010 NO CARD FOR THIS ILLUSTRATION.

Figure 4A:
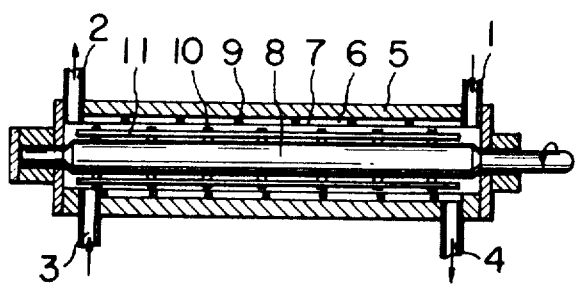
FIG. 4a and 4b show, respectively, longitudinal and transverse cross-sectional use of a cylindrical heater provided with an inner stirrer to be used for carrying out the present invention.
Figure 4B:
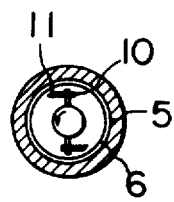

The cylindrical heater provided with an inner stirrer to be used in the present invention, for example, as shown in FIG. 4, is preferably provided with a heating means in the outer periphery and can transfer quantitatively the mixed solution having a high viscosity.

As the heating means, use may be made of electricity, steam, hot water and the other heat mediums. It is the most preferable that hot water heated in a separate tank is circulated through the jacket in the outside of the cylindrical heater under an automatic control of temperature. The cylindrical heater is provided with a shaft equipped with blades or a screw in the interior and by the rotation the content is successively fed from the inlet to the outlet.

Referring to FIG. 4, the cylindrical heater will be explained, 1 is an inlet for the mixed solution, 2 an outlet for the mixed solution, 3 an inlet for hot water, 4 an outlet for hot water, 5 heat insulating material, 6 a jacket, 7 a heat conductive cylinder, 8 a shaft, 9 a spiral partition, 10 a set pin and 11 a blade.

Polyvinyl alcohols to be used are completely saponified ones or partially saponified ones and may have various polymerization degrees and further may be copolymers with other vinyl monomers.

As starch, use may be made of any starch obtained in plants, for example, crop starch, root starch, modified starch and the like.

As aldehydes to be used for the acetalization reaction, use may be made of aliphatic or aromatic mono- or dialdehydes, but from the economic point of view, formaldehyde is most preferable.

The acids to be used as the catalyst for the acetalization reaction are mineral acids and organic acids, such as sulfuric acid, hydrochloric acid and phosphoric acid.

In order to cool the gelatinized mixed solution and simultaneously to defoam said solution, a thin layer flowing type of vacuum defoaming cooler may be used.

Figure 5:
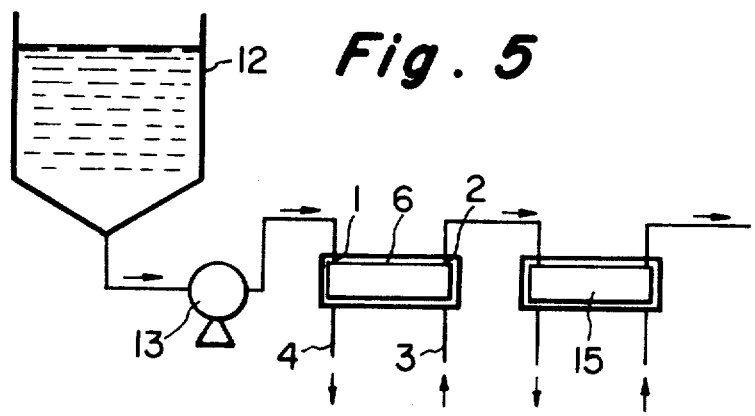
FIG. 5 shows a flow sheet for illustrating the production of the mixed solution for producing polyvinyl acetal spongy articles according to present invention.

The present invention will be explained with reference to FIG. 5.

A heated and dissolved aqueous solution of polyvinyl alcohol is cooled to a temperature below the gelatinizing temperature of starch and an aqueous dispersion of starch is added thereto and the resulting mixture is charged in a tank 12. In the case of potato starch powder, this temperature is about 50° C. The mixture is charged into the cylindrical heater 14 quantitatively through an inlet 1 by means of a metering pump 13 and discharged continuously through an outlet 2. During passage through the cylindrical heater, the mixture is heated to the given temperature by hot water passing through a jacket 6 provided in the outside of the heater and the starch in the mixed solution is gelatinized to the desired degree. The discharged polyvinyl alcohol-gelatinized starch mixed solution is introduced into a heat exchanger 15 for cooling, to be cooled to the given temperature. The cooled mixed solution discharged from the heat exchanger 15 is added with the given amounts of an aldehyde and an acid and then introduced into the desired mold and then heated to form polyvinyl acetal porous articles. Thereafter, the porous articles are washed with water in a conventional manner to obtain the spongy product.

Figure 6:
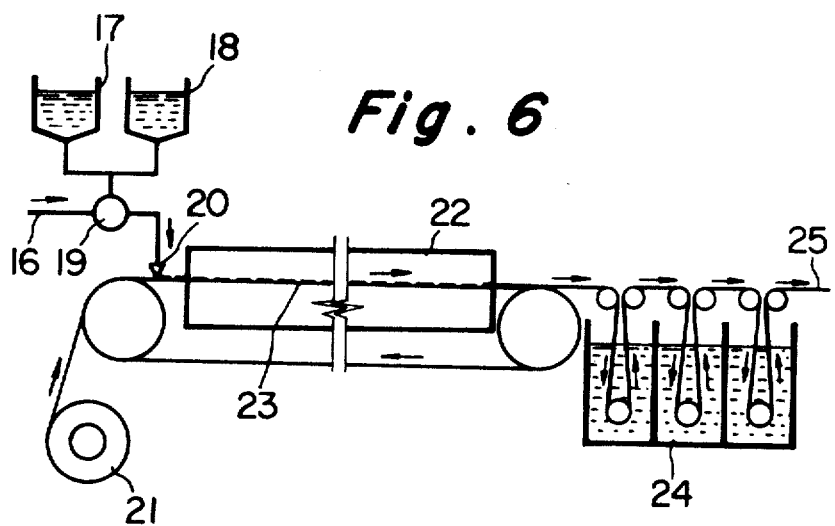
FIG. 6 shows a flow sheet for illustrating the production of a spongy sheet from the mixed solution produced through the steps as shown in FIG. 5.

In order to obtain a long continuous spongy sheet, as shown in FIG. 6, the mixed solution discharged from the cooling heat exchanger 15 is fed to a mixer 19 through a pipe 16 and supplied with the given amounts of an acid and an aldehyde fed from the tanks 17 and 18 and the resulting reaction solution is thoroughly mixed and flowed on an endless belt heater 23 through a slit-shaped nozzle 20 and then passed through a continuous heater using steam or other heating medium to effect acetalization. The formed porous article is treated continuously in a water washing tank 24 to obtain a long spongy sheet. When a reinforcing substrate is needed, a means 21 for supplying the substrate, for example, an acid resistant woven fabric, film and the like taken out from a substrate supplying means 21 is placed on the endless belt heater 23 continuously and then the reaction solution is flowed thereon.

The following examples are given in illustration of this invention but are not limitative thereof. In the examples, "part" means "part by volume."

EXAMPLE 1

80 Kg of polyvinyl alcohol having an average polymerization degree of 1,500 and a saponification degree of 99 percent were dissolved in hot water, and the resulting hot solution was cooled to about 60° C. The solution was added with a dispersion of 15 Kg of corn starch in water, and further added with water until the total volume of the mixture was 1,000 l. Then, the temperature of the mixture was adjusted to 50° C. During the above procedure, stirring was continued so that the corn starch did not deposit. The mixture was charged into a cylindrical heater of 28 l capacity at a rate of 7 l/min. by means of a metering pump. The cylindrical heater was equipped with a stirrer rotating at a rate of 300 r.p.m. and a jacket circulating hot water at 85° C. at a rate of 100 l/min. The residence time of the mixture in the heater was about 4 minutes, during which the starch was gelatinized and mixed homogeneously with the aqueous solution of the polyvinyl alcohol. The gelatinizing mixed solution discharged from the heater had a temperature of 76 ± 1° C., and the starch-polyvinyl alcohol mixed solution was gelatinized always to a constant degree.

The resulting starch-polyvinyl alcohol mixed solution was cooled to 45° C. by a heat exchanger, and mixed continuously with formaldehyde and 50 percent sulfuric acid at a rate of 10 and 12 parts respectively per 100 parts of the mixed solution to obtain a reaction solution. The resulting reaction solution was injected into a mold and a formalization reaction was effected at 60° C. for 24 hours. The reaction product was taken out from the mold and washed with water to obtain a polyvinyl formal porous article.

In the resulting porous article, the porosity was 89 percent and the average diameter of the pores was 80$\mu$. This porous article was able to be produced with a high reproducibility. The defective fraction in the product of this example was only 2 percent as compared with that of 22 percent in the product prepared using the same compounding recipe by a batch process.

The above-mentioned reaction solution was flowed continuously on a stainless steel vat having a length of 40 cm, a width of 50 cm and a depth of 12 cm, which was moved by means of a roller conveyor, through a T-die nozzle having a width of 50 cm. The extrusion rate of the reaction solution and the velocity of the conveyor were adjusted so that 250 ml of the reaction solution was flowed evenly on the vat. A Japanese paper was placed on the reaction solution, and after the paper was impregnated thoroughly with the solution, another part of the reaction solution was flowed on the paper again from the second nozzle, and a reinforcing plain weave cloth consisting of synthetic fibers was placed on the reaction solution. This procedure was repeated successively in the order of reaction solution-Japanese paper-reaction solution-cloth-reaction solution until the reaction solution was flowed 40 times. The vat was placed in an air bath kept at 40° C. for 42 hours to effect a formalization reaction of the reaction solution. After completion of the formalization reaction, the resulting laminated sheet was washed thoroughly with water to remove the Japanese papers, whereby shammy-like spongy sheets having an interlining cloth were obtained.

The spongy sheets obtained according to the present invention have a uniform property due to the use of the reaction solution prepared by a continuous process. The defective fraction of the spongy sheet in the present invention was 3 percent, while that in the conventional handiwork was 16 percent. Therefore, the present invention is extremely superior to the conventional processes.

EXAMPLE 2

95 Kg of polyvinyl alcohol having an average polymerization degree of 1,700 and a saponification degree of 99 percent were dissolved in hot water, and the resulting hot solution was cooled to 55° C. The solution was added with a dispersion of 50 Kg of potato starch in water, and further added with water until the total volume of the mixture was 1,000 l. Then, the mixture was gelatinized in the same manner as described in Example 1, except that the mixture was heated in a cylindrical heater by circulating hot water kept at 80° C. at a rate of 80 l/min.

The gelatinized starch-polyvinyl alcohol mixed solution discharged from the cylindrical heater had a temperature of 68° C. The viscosity of this mixed solution was always 620 ± 25 cps (measured at 50° C.) and did not show such a large variation as in the batch process.

This mixed solution was cooled immediately to 45° C. by means of another heat exchanger, mixed continuously with formaldehyde and surfuric acid, and the resulting reaction solution was subjected to a formalization reaction at 50° C. for 30 hours to obtain a polyvinyl formal porous article. In the resulting porous article, the porosity was 88 percent and the average diameter of pores was 150$\mu$.

EXAMPLE 3

80 Kg of polyvinyl alcohol having an average polymerization degree of 1,500 and a saponification degree of 99 percent and 18 Kg of polyvinyl alcohol having an average polymerization degree of 500 were dissolved in hot water, and the resulting hot solution was cooled to 60° C. The solution was added with a dispersion of 60 Kg of wheat starch in water, and further added with water until the total volume of the mixture was 1,000 l. The resulting mixture was gelatinized in the same manner as described in Example 1, except that the mixture was fed into a cylindrical heater at a rate of 15 l/min. and heated to 73° C. by circulating hot water.

The gelatinized solution was flowed down on the wall of a vacuum defoaming cooler kept at a reduced pressure of 80 mm Hg to effect defoaming and cooling at the same time, whereby the temperature of the solution was cooled to 45° C. Then, a polyvinyl formal porous article was prepared by subjecting to an acetalization reaction at 50° C. for 24 hours. The average diameter of the pores in the resulting polyvinyl formal porous article was 60μ.

EXAMPLE 4

60 Kg of polyvinyl alcohol having an average polymerization degree of 1,500 were dissolved in hot water, and the resulting hot solution was cooled to 50° C. The solution was added with a dispersion of 45 Kg of potato starch in water and further added with water until the total volume of the mixture was 1,000 l. The resulting mixture was gelatinized in a cylindrical heater in the same manner as described in Example 1 to obtain a gelatinized mixed solution having a temperature of 70° C. This gelatinized solution was cooled to 50° C. by a vacuum cooler described in Example 3 and added with formaldehyde and 50 percent sulfuric acid at a rate of 9 and 11 parts of formaldehyde and 50 percent sulfuric acid respectively per 100 parts of the gelatinized solution, and further with dextrin granules in an amount of 3 percent by weight based on the total weight of the resulting mixture. The resulting reaction solution was mixed homogeneously and heated at 60° C. for 10 hours in a mold having a predetermined shape to obtain a polyvinyl formal porous article, which can be used advantageously as a cosmetic puff.

EXAMPLE 5

20 Kg of polyvinyl alcohol having an average polymerization degree of 1,500 and a saponification degree of 99 percent were dissolved in hot water and the resulting hot solution was cooled to about 60° C. The solution was added with a dispersion of 40 Kg of potato starch in water and further added with water until the total volume of the mixture was 250 l. The temperature of the mixture was adjusted to 50° C. During the above procedure, stirring was continued so that the starch did not deposit. The mixture was charged into a cylindrical heater of 7.5 l capacity at a rate of 1.5 l/min. by means of a metering pump. The cylindrical heater was equipped with a stirrer rotating at a rate of 300 r.p.m. and a jacket circulating hot water at 90° C. at a rate of 50 l/min. The residence time of the mixture in the heater was about 5 minutes, during which the potato starch was gelatinized and mixed homogeneously with the aqueous solution of the polyvinyl alcohol. Then, the gelatinized solution was cooled to 50° C. by a cylindrical heat exchanger and added continuously with 37 percent formaldehyde and 50 percent sulfuric acid at a rate of 14 and eight parts respectively per 100 parts of the gelatinized solution to obtain a reaction solution. This reaction solution was flowed on an endless belt heater placed in a continuous molding machine through a slit-shaped nozzle. The reaction solution on the belt heater was moved at a constant speed and heated at 90° C. for 30 minutes in a furnace, and the resulting sheet was subjected to continuous deacidification and washing with water to obtain a white and beautiful continuous polyvinyl acetal porous sheet having fine uniform pores.

What is claimed is:

1. A method of producing polyvinyl acetal porous articles, which comprises forming a dispersion by adding starch particles or a suspension of ungelatinized starch particles in water to an aqueous solution of polyvinyl alcohol having a relatively low temperature, continuously flowing said dispersion into one end of and through a tubular heater provided with an internal stirrer and an outer heating means and in said heater continuously agitating said dispersion and heating same to a temperature sufficient to gelatinize starch in the dispersion by the time the continuously flowing dispersion reaches the other end of the heater, continuously withdrawing the gelatinized dispersion from the heater, cooling said gelatinized dispersion to a temperature at which swelling and gelatinization of the starch do not proceed, adding acid and aldehyde continuously to the cooled gelatinized dispersion to form a reaction solution, heating the resulting reaction solution to effect an acetalization reaction and simultaneously forming a shaped polyvinyl acetal porous article and then washing the polyvinyl acetal porous article with water.

2. A method as claimed in claim 1, in which the reaction solution is flowed onto an endless belt to form a layer thereon and heating the layer on the endless belt to effect an acetalization reaction and to form a spongy sheet.

3. The method as claimed in claim 1, wherein after the gelatinized dispersion is withdrawn from the heater, the gelatinized dispersion is cooled in a separate continuous type cooler.

4. The method as claimed in claim 3, wherein said continuous type cooler is a vacuum defoaming cooler.

5. The method as claimed in claim 3, wherein said continuous type cooler is a cylindrical heat exchanger.

* * * * *

UNITED STATES PATENT OFFICE
CERTIFICATE OF CORRECTION

Patent No. 3 673 125                     Dated June 27, 1972

Inventor(s) Kenji Takahashi, Toshio Yamamura, Mitsuzo Ono and Korekiyo Eda

It is certified that error appears in the above-identified patent and that said Letters Patent are hereby corrected as shown below:

---Claim 6

The method as claimed in Claim 1, wherein said acid and aldehyde are sulfuric acid and formaldehyde respectively.---

Signed and sealed this 26th day of December 1972.

(SEAL)
Attest:

EDWARD M. FLETCHER, JR.
Attesting Officer

ROBERT GOTTSCHALK
Commissioner of Patents